United States Patent [19]
Fratini, Jr.

[11] Patent Number: 5,692,587
[45] Date of Patent: Dec. 2, 1997

[54] VEHICLE CHASSIS SYSTEM CONTROL

[75] Inventor: Albert Victor Fratini, Jr., Kettering, Ohio

[73] Assignee: General Motors Corporation, Detroit, Mich.

[21] Appl. No.: 751,892

[22] Filed: Nov. 18, 1996

Related U.S. Application Data

[63] Continuation-in-part of Ser. No. 441,369, May 15, 1995.

[51] Int. Cl.$^6$ ............ B60G 17/00; B60G 17/015
[52] U.S. Cl. ............ 188/299; 280/707; 280/711; 303/195
[58] Field of Search ............ 280/707, 688, 280/703, 840; 364/426.01, 426.02, 426.05; 188/299; 180/902, 141, 142, 143; 324/166, 160; 303/168, 194, 195, 196

[56] References Cited

U.S. PATENT DOCUMENTS

| | | | |
|---|---|---|---|
| 4,634,142 | 1/1987 | Woods et al. | 270/707 |
| 4,826,206 | 5/1989 | Immega | 280/711 |
| 4,905,783 | 3/1990 | Bober | 180/142 |
| 4,912,967 | 4/1990 | Shiraishi et al. | 73/105 |
| 4,924,392 | 5/1990 | Kurosawa | 364/424.05 |
| 4,937,748 | 6/1990 | Yonekawa et al. | 364/424.05 |
| 5,013,062 | 5/1991 | Yonekawa et al. | 280/707 |
| 5,056,812 | 10/1991 | Takehara et al. | 280/707 |
| 5,062,658 | 11/1991 | Majeed | 280/707 |
| 5,071,157 | 12/1991 | Majeed | 280/707 |
| 5,097,419 | 3/1992 | Lizell | 364/424.05 |
| 5,142,476 | 8/1992 | Shibata et al. | 364/424.05 |
| 5,276,621 | 1/1994 | Henry et al. | 364/424.05 |
| 5,444,621 | 8/1995 | Matsunaga et al. | 364/424.05 |
| 5,454,630 | 10/1995 | Zhang | 303/195 |

Primary Examiner—Matthew C. Graham
Attorney, Agent, or Firm—Anthony Luke Simon

[57] ABSTRACT

A vehicle chassis system control for use in a vehicle with a first suspension that induces a phase shift on body motion components of wheel speed sensor signals from a first set of wheel speed sensors connected to a first set of wheels mounted to the first suspension, comprising the steps of: sensing first rotational velocities of the first set of wheels using the first set of wheel speed sensors; sensing second rotational velocities of a second set of wheels mounted to a second suspension using a second set of wheel speed sensors; estimating at least one modal velocity of a body of the vehicle responsive to the first and second rotational velocities, wherein the step of estimating comprises the sub-steps of: (a) imposing a relative phase shift between the first and second rotational velocities to compensate for the phase shift induced by the first suspension, (b) transforming the relative phase shifted first and second rotational velocities to a signal indicative of a modal velocity of the body of the vehicle using a corner to body modal transform, and (c) filtering at least one member of a set comprising (i) the first and second rotational velocities and (ii) the signal indicative of the modal velocity of the body of the vehicle, to isolate body frequency components of said at least one member; determining a chassis system control command responsive to the estimation; and applying the chassis system control command to a chassis system actuator to control the chassis system responsive to the estimation.

4 Claims, 5 Drawing Sheets

VEHICLE CHASSIS SYSTEM CONTROL

This invention is a continuation-in-part of pending patent application, U.S. Ser. No. 08/441,369, filed May 15, 1995 assigned to the assignee of this invention.

This invention relates to a vehicle chassis system control.

BACKGROUND OF THE INVENTION

Many vehicles are marketed with one of more controllable vehicle chassis systems, such as anti-lock brake systems, traction control systems, and controllable variable force suspension systems. A typical antilock brake system includes wheel rotational velocity sensors that provide, for each wheel, an output signal indicative of wheel rotational velocity.

U.S. Pat. No. 5,454,630, assigned to the assignee of this invention, describes an automotive anti-lock braking system that uses vehicle wheel sped sensors, wheel-to-body relative position sensors and body corner accelerometers to affect a desired anti-lock braking control. U.S. Pat. No. 5,062,658, assigned to the assignee of this invention, describes a vehicle variable force suspension system control responsive to body-to-wheel relative position sensors and body corner accelerometers.

The above-mentioned parent patent application Ser. No. 08/441,369, describes a vehicle chassis system control that uses wheel speed sensor outputs to develop information allowing control of a vehicle suspension system and/or anti-lock brake system similar to that achieved in the above mentioned patents while eliminating the body-to-wheel relative position sensors and body corner accelerometers.

SUMMARY OF THE PRESENT INVENTION

A vehicle chassis system control in accordance with the present invention is characterized by the features specified in claim 1.

Advantageously, this invention provides a vehicle chassis system control suitable for use with anti-lock brake systems, variable force suspension systems and/or other chassis control systems while eliminating the number of input devices necessary to control such systems.

Advantageously, this invention recognizes that wheel speed signals provided by known types of wheel speed sensors carry information representative of body and wheel vertical motion, for example, body to wheel relative position. Advantageously, this invention further recognizes that the relationship between the wheel speed signals and the body and wheel vertical motion varies depending upon the type of suspension used on the vehicle and that such variations occur in the form of a phase shift of the body content portions of the wheel speed signals.

For example, the semi-trailing arm rear suspension reacts to road disturbances differently than McPherson strut type suspensions and short-long arm type suspensions because the lower suspension arm is allowed to pivot during relative wheel-body movement. With the wheel speed sensor mounted on the end of the lower suspension arm, the pivoting during suspension movement is a factor that affects the resultant output of the wheel speed sensor along with the vehicle road speed and the deviations in tire rolling radius caused by road inputs. As a result, the body and wheel motion information in the wheel speed signal of a trailing arm rear suspension is phase-shifted between $\pi/2$ and $\pi$ radians with respect to similar information in the wheel speed signal of a McPherson strut type suspension. The processing of wheel speed signals into body motion information needs to take into account the phase shift of the signals from suspensions such as the semi-trailing arm rear suspension.

Advantageously, this invention provides a method for use with a controllable chassis system, such as a variably force suspension control system or electronically controllable brake system, in a vehicle with a semi-trailing arm or other suspension that phase-shifts body and/or wheel vertical motion information components of the wheel speed sensor information. Advantageously, this invention is responsive to wheel speed sensor information and compensates for such phase shifts to develop signals indicative of body and/or wheel movement, and to develop control commands responsive thereto.

According to a preferred example, this invention provides A vehicle chassis control for use in a vehicle with a first suspension that induces a phase shift on body motion components of wheel speed sensor signals from a first set of wheel speed sensors connected to a first set of wheels mounted to the first suspension, comprising the steps of: sensing first rotational velocities of the first set of wheels using the first set of wheel speed sensors; sensing second rotational velocities of a second set of wheels mounted to a second suspension using a second set of wheel speed sensors; estimating at least one modal velocity of a body of the vehicle responsive to the first and second rotational velocities, wherein the step of estimating comprises the sub-steps of: (a) imposing a relative phase shift between the first and second rotational velocities to compensate for the phase shift induced by the first suspension, (b) transforming the relative phase shifted first and second rotational velocities to a signal indicative of a modal velocity of the body of the vehicle using a corner to body modal transform, and (c) filtering at least one member of a set comprising (i) the first and second rotational velocities and (ii) the signal indicative of the modal velocity of the body of the vehicle, to isolate body frequency components of said at least one member; determining a chassis system control command responsive to the estimation; and applying the chassis system control command to a chassis system actuator to control the chassis system responsive to the estimation.

BRIEF DESCRIPTION OF THE DRAWINGS

The present invention will now be described by way of example with reference to the accompanying drawings in which.

DETAILED DESCRIPTION OF THE INVENTION

Figure 1:
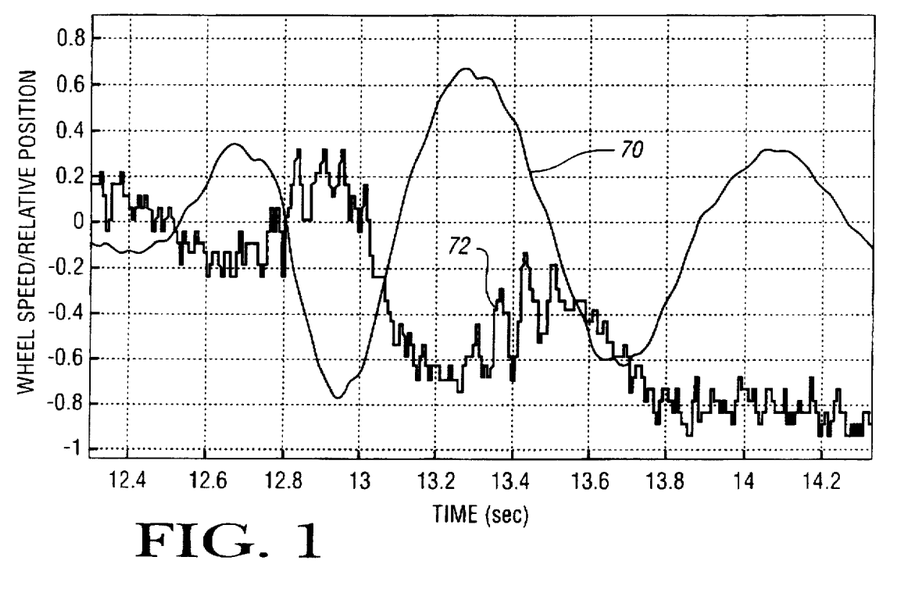
FIG. 1 illustrates a wheel speed sensor output for a front strut-type suspension of a vehicle driven over a certain patch of road.
Figure 2:
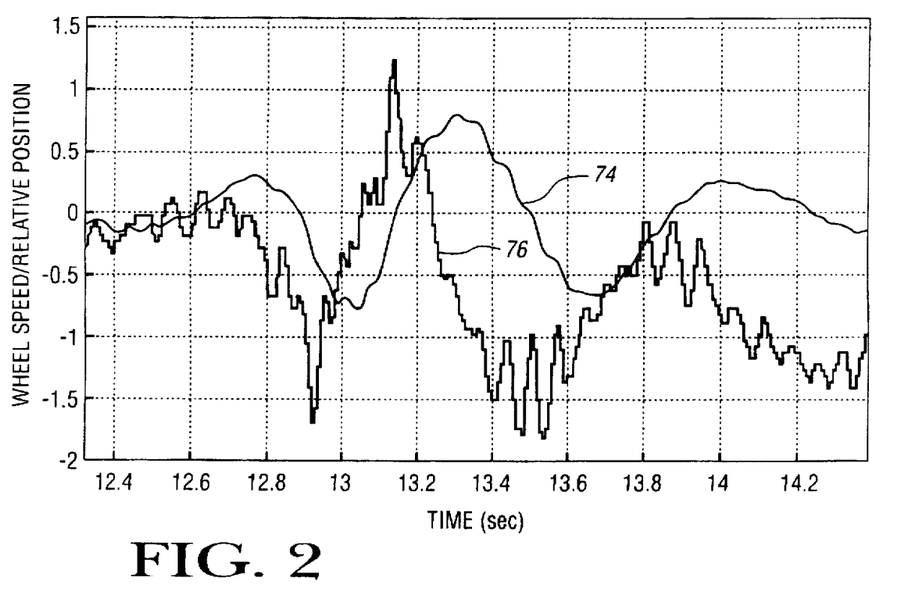
FIG. 2 illustrates a wheel speed sensor output for a semi-trailing arm rear suspension of the same vehicle driven over the same patch of road referred to with respect to FIG. 1.

Referring to FIGS. 1 and 2, the plots shown illustrate a recording of an example suspension system event of a test vehicle's front and rear wheels, respectively, traveling down the same patch of road. In FIG. 1, reference 70 represents the corner relative position signal as measured by a body-wheel relative position sensor of a known type. The relative position signal 70 is plotted against the wheel speed signal 72, which is produced in response to a known wheel speed sensor of the type used to control anti-lock brake systems. The relative position signal 70 is primarily a low frequency signal, i.e., in the one hertz range, and the wheel speed signal 72 contains both the low frequency component reflected in the relative position signal and a high frequency component, i.e., in the fifteen hertz range, indicated by the closely spaced dips and swells. In general, the low frequency component represents body motion and the high frequency component represents wheel motion.

A known type of sensor for providing the wheel speed signal comprises a toothed ring that rotates with the wheel and a fixed variable reluctance sensor that creates a stream of pulses having a frequency proportional to the rotational speed of the toothed ring. The rotational velocity of the toothed ring is proportional to the radius of the wheel's tire, which fluctuates in response to disturbances in the road and in response to vehicle load transfers such as occur during cornering, vehicle braking or vehicle acceleration. As the tire radius decreases, the wheel and ring rotate faster and as the tire radius increases, the wheel and ring rotate slower. For example, when a vehicle first encounters a rise in the road, the vehicle body travels downward relative to the road. As the vehicle passes the peak of the rise, the body travels upward relative to the road, then downward again as the vehicle exits the rise. In this event, the suspension and tires will compress, expand, and compress again with the downward, upward and then downward movement of the body. The resulting suspension compression, expansion and compression is measured as a change in the relative positions or velocities between the wheels and the body and the compression, expansion and compression of the tires causes the tires to rotate faster, slower, then faster again, which response is reflected in the wheel speed signal 72.

The graph in FIG. 2 illustrates the relative position signal 74 for the semi-trailing arm rear suspension of the same vehicle over the same patch of road. As can be seen, the phase and frequency of the relative position signal 74 matches that of the front relative position signal 70. The rear wheel speed signal 76, on the other hand, behaves differently than the front wheel speed signal 72. While it is evident that the rear wheel speed signal contains both low (i.e., one hertz) and high (i.e., fifteen hertz) frequency components responsive to corner suspension activity, the relationship between suspension activity and wheel speed for the rear suspension is clearly different than that of the front suspension This difference can be understood now with reference to FIG. 3. The response of the wheel 78 to road inputs in suspensions such as the semi-trailing arm rear suspension is to pivot with lower arm 82 about the arm's pivot point 84. The wheel speed sensor is mounted at the end 80 of the arm 82, with the exciter ring mounted to the vehicle wheel 78. The primary response of the sensor output is to the road speed of the wheel 78. As mentioned above, a secondary response is introduced when road inputs cause deflection of the wheel 78 and fluctuations in the rolling radius of the wheel 78. Another secondary response is introduced when arm 82 pivots about point 84, affecting the relative position of the speed sensor with respect to the exciter ring. Assuming the wheel 78 is rotating in the direction indicated by arrow 81, during compression, there is a net reduction in the wheel speed output of the wheel speed sensor while the pivot arm 84 is pivoting and, during rebound or extension, there is a net increase in output of the wheel speed sensor while the pivot arm 84 is pivoting.

Figures 3, 5:
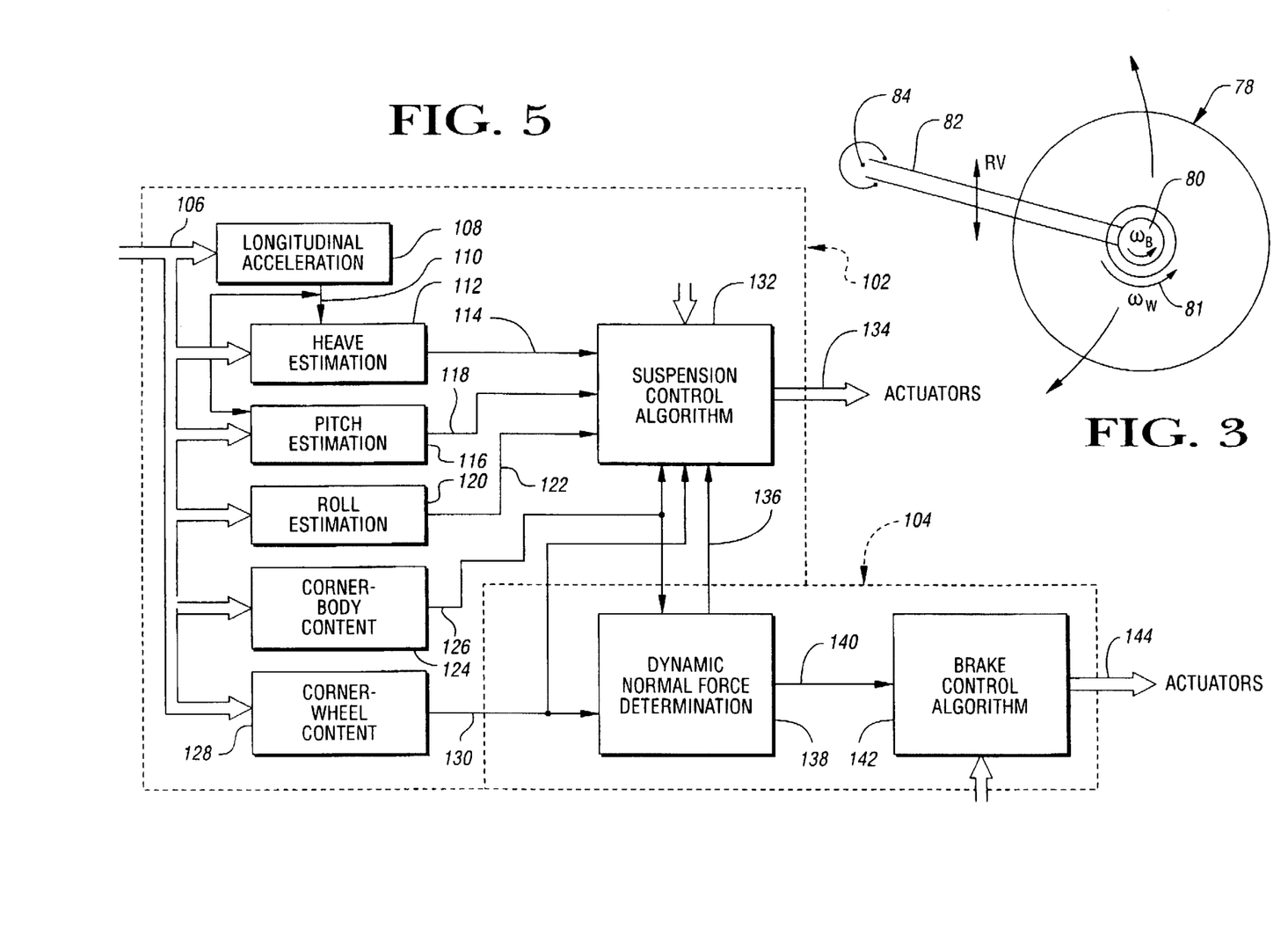
FIG. 3 illustrates schematically the operation of a semi-trailing arm rear suspension.
FIG. 5 illustrates schematically an example control according to this invention.

The effects of this pivoting motion on the wheel speed signal are a factor not encountered in a strut-type suspension. The result of the pivoting motion is that the body vertical motion components of the wheel speed signal, i.e., fluctuations in the body frequency range, here 1 Hz, are phase shifted between $\pi/2$ and $\pi$ radians with respect to body vertical motion components of the wheel speed signal 72 in FIG. 1.

This invention recognizes that suspensions exist that impart a relative phase shift on the body motion information component of the wheel speed sensor signals. The relative phase shift introduces errors into estimations of body heave, pitch and/or roll velocity or other body motions and, depending upon the mount of the phase shift, can render some or all of such estimations unsuitable for use as control inputs for a chassis control system. As described herein, a control is provided for estimating the modal velocities of the vehicle body in a manner that compensates for a relative phase shift imparted by a suspension on the body vertical motion component of the wheel speed sensor signal.

Figure 4:
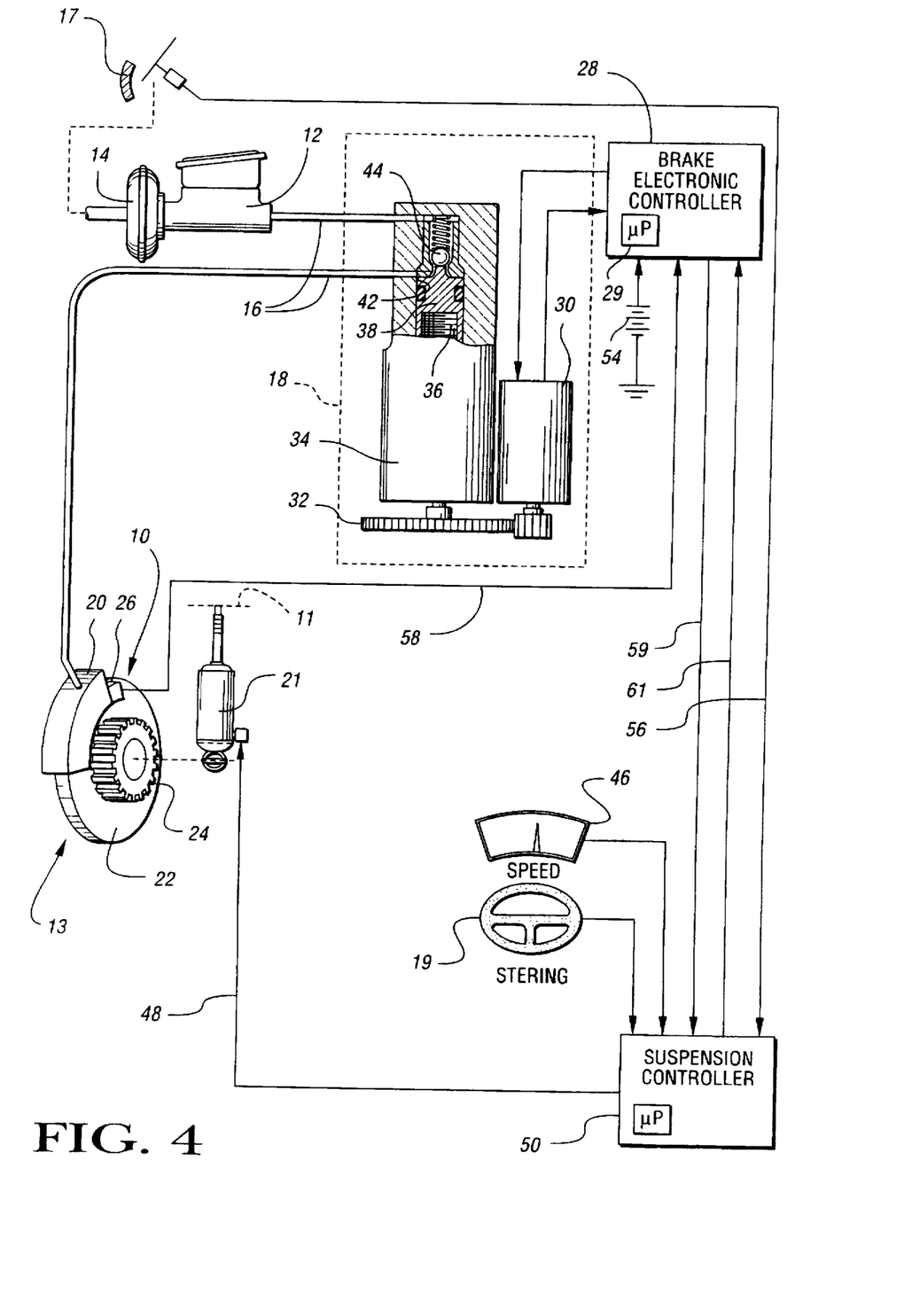
FIG. 4 illustrates a schematic of an example vehicle chassis control system according to this invention.

Referring now to FIG. 4, the example shown illustrates a vehicle chassis control system that provides anti-lock braking and variable force suspension control. While a separate traction control actuator is not shown, it is understood that such an actuator may be included in the system.

The wheel lock control system (anti-lock brake system) shown includes, on wheel 13, a brake unit 10 operated by hydraulic pressure from master cylinder 12 and hydraulic boost unit 14 in response to depression of the brake pedal 17 by the vehicle operator. Brake line 16 and a pressure modulator 18 provide the path of hydraulic fluid under pressure from the master cylinder 12 to the brake unit 10. The brake unit 10 is illustrated as a disc brake system that includes a caliper 20 located at a rotor 22.

The wheel 13 also includes a wheel speed sensor assembly comprising an exciter ring 24 that rotates with the wheel and an electromagnetic sensor 26 that monitors the rotation of the exciter ring to provide a signal having a frequency proportional to the rotational speed of the wheel. The wheel rotational speed signal from the sensor 26 is provided to an electronic controller 28 that includes a microprocessor 29. The electronic controller 28 controls the pressure modulator 18 in a known manner to modulate and/or limit the brake pressure applied to the wheel brake assembly 10 to prevent a wheel lock-up condition.

During vehicle braking, when the controller 28 senses a an incipient lock-up condition of the wheel 13, the pressure modulator 18 is controlled to regulate the braking pressure to the wheel to maintain the braking of the wheel in a stable braking region. The pressure modulator example shown includes a DC torque motor 30 having an output shaft that drives a gear train 32 that, in turn, rotates a linear ball screw actuator 34. The ball screw actuator 34 contains a linearly stationary ball screw that, when rotated, linearly positions a ball nut 36. The ball nut 36 terminates in a piston 38 that is either extended or retracted within cylinder 42 depending on the direction of rotation of the torque motor 30. The cylinder 42 forms a portion of the fluid path between the master cylinder 12 and the wheel brake 10. Included within this fluid path is a normally closed ball check-valve 44 that, when closed, isolates the master cylinder 12 from the wheel brake unit 10. The ball check valve 44 is maintained in an open position by the piston 38 when piston 38 is positioned in the extended (home) position within the cylinder 42 illustrated in FIG. 4. When the check valve 44 is open, fluid communication is provided between the master cylinder 12 and the wheel brake unit 10. This position is the normal inactive position of the pressure modulator 18 so that normal braking of the wheel of the vehicle is provided upon actuation of the brakes by the vehicle operator, and the modulator 18 is transparent to the braking system.

However, when torque motor 30 is operated by the electronic controller 28 to modulate the braking pressure in the wheel brake unit 10, the piston 32 is retracted allowing the ball check valve to seat and isolate the master cylinder 12 from the wheel brake unit 10 as long as the pressure in the cylinder 42 is less than the pressure from the master cylinder 12. Further retraction of the piston 38 functions to increase the volume of the cylinder 42, thereby decreasing the pressure applied to the wheel brake unit 10. By controlling the DC torque motor 30 in a known manner, a pressure at the wheel brake 10 is modulated to control values less than the master cylinder pressure output until such time that the piston 38 again unseats the ball check valve 44 or until the pressure generated by the pressure modulator at the wheel brake 10 exceeds the fluid pressure output of the master cylinder 12. When this latter condition exists, the ball check valve 44 is opened by the differential fluid pressure, which limits the pressure of the wheel brake unit 10 to that of the master cylinder 12. In this manner, the wheel cylinder pressure never exceeds the operator's established pressure.

The vehicle body 11 is supported by four wheels 13 (only one shown) and by four suspensions including springs of a known type (not shown). Each suspension includes a variable-force real time controllable damper 21 (only one shown) connected between wheel 13 and body 11 at the suspension point to exert vertical force opposing relative vertical motion between wheel 13 and body 11. Although many such suspension arrangements are known and appropriate to this invention, actuator 21, in one example, comprises an electrically controllable, variable force damper in parallel with a weight bearing coil spring in a parallel shock absorber/spring or McPherson strut arrangement. A description of an example variable force damper suitable for use as actuator 12 is the continuously variable damper described in U.S. Pat. No. 5,282,645, assigned to the assignee of this invention.

The outputs of rotational velocity sensors 26 are processed in the brake controller 28 and also provided to suspension controller 50, including microprocessor 52. Controller 50 processes the signals to determine estimates of the activity of vehicle body 11 and/or wheels 13 and generates an output actuator control signal on line 48 to control each variable force actuator 21 in real time. Input signals for the determination of the output actuator control signals may also be provided to controller 50 by a conventional brake switch on brake pedal 17 and by a throttle position sensor (not shown) to provide anticipation of vehicle pitch (lift/dive) and by a vehicle speed sensor 46 and a steering wheel angular position sensor 19 to provide anticipation of vehicle roll. Obtaining such signals is easily achieved through the use of known types of sensors available to those skilled in the art.

In this example, line 61 transfers, from suspension controller 50 to the brake electronic controller 28, signals representative of the states of operation of the vehicle suspension system, which states include suspension relative velocity, body absolute heave, pitch and/or roll velocity, and/or wheel absolute velocity signals determined via implementation of this invention. The configuration shown is one example, the processing of the input signals may take place in either controller, as desired by the system designer, or in a single controller implemented to control both suspension and brake functions.

With the exception of the improvements set forth herein and in the pending applications referred to herein, the control functions of the brake controller 28 and suspension controller 50, including signal input and output processing and the general brake and suspension control functions, are of a type well known to those skilled in the art and further detail of the brake controller 28, suspension controller 50 and the controls implemented therein need not be set forth herein.

Referring now to FIG. 5, the suspension control 102 receives the wheel speed signals represented by bus 106 to various processing functions represented by blocks 108, 112, 116 and 120, 124 and 128.

Block 108 determines an indicator of vehicle longitudinal acceleration to represent the vehicle body's potential to dip or lift in response to braking or acceleration of the vehicle. Block 108 first determines a weighted average of the wheel speeds of the four vehicle wheels as follows:

$$V_{ave}=K_1*\omega_{LF}+K_2*\omega_{RF}+K_3*\omega_{LR}+K_4*\omega_{RR},$$

where $V_{ave}$ is the weighted average of the wheel speeds, $K_1$, $K_2$, $K_3$ and $K_4$ are scale factors and $\omega_{LF}$, $\omega_{RF}$, $\omega_{LR}$, and $\omega_{RR}$ are the left front, right front, left rear and right rear wheel speeds, respectively. The sum of the scale factors $K_{1-4}$ equals unity and the scale factors are set at fixed values proportioned between front and rear so that all of the wheels yield a constant result when their scale factors are multiplied by the individual wheel average rotational velocity variation in response to road inputs. For example, $$K_1*\Delta\omega_{LFave}=K_2*\Delta\omega_{RFave}=K_3*\Delta\omega_{LRave}=K_4*\Delta\omega_{RRave},$$

where, $\Delta\omega_{LFave}$, $\Delta\omega_{RFave}$, $\Delta\omega_{LRave}$ and $\Delta\omega_{RRave}$ are the average wheel rotational velocity variations in response to a given road input.

The weighted average is then differentiated, for example, through a band pass filter having a center frequency around 1 Hz to produce an estimate of vehicle longitudinal acceleration. If the estimated acceleration at block 108 has a magnitude greater than a predetermined threshold corresponding to a vehicle propensity to lift or dive, a longitudinal acceleration flag is set, whose state is indicated on line 110. If desired, block 108 can be omitted and the signal on line 110 can be provided if a hard braking or hard acceleration is detected, for example, from a sensor indicating change in throttle opening or sudden change in brake pressure or depression of the brake pedal.

Block 112 responds to the wheel speed signals on bus 106 to estimate a heave velocity of the vehicle body. The estimation of the heave velocity can be better understood with reference now to FIG. 6.

Figure 6:
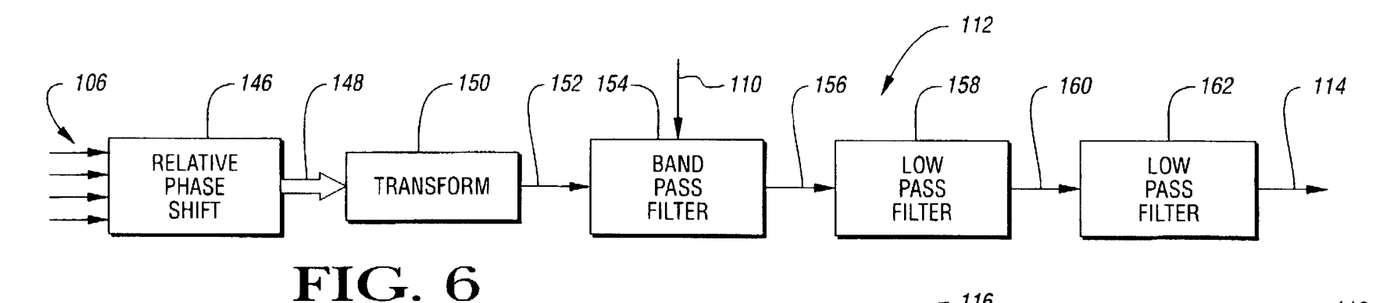
FIG. 6 illustrates an example control for determining vehicle body heave velocity.

The wheel speed signals are provided to block 146 whose output is provided to block 150. Block 146 imparts a relative phase shift on the wheel speed signals that have body vertical motion components out of phase with the actual vehicle body motion. Block 146 then performs the required transform to estimate the desired body modal velocity, which, in this case, is heave velocity. For example, in an example vehicle with a strut-type front suspension and a semi-trailing arm rear suspension, the rear suspension, as explained above, imparts a phase lag of approximately ninety degrees on the body vertical motion information content of the wheel speed signal. In this example, block 146 phase shifts the wheel speed signals to bring them into proper phase alignment, allowing the transform at block 150 to be performed.

The phase shift function of block 146 can be accomplished several ways. For example, the front wheel lag f signals can be coupled to a lag filter of a known type to add to the front wheel speed signals the same lag already in the rear wheel speed signals due to the rear suspension, thus phase-aligning the all four wheel speed signals. Alternatively, the rear wheel speed signals can be processed into an estimation filter using a known model of suspension performance to impart a phase advance on the body motion components of the rear wheel speed signals to bring them into phase alignment with the front wheel speed signals.

In many controls it is imperative that the phase adjustment take place in real time. To this end, the function of the relative phase shift block 146 can be combined with the function of the transform block 150 into a single step. For example, the transform equation is provided to impart the desired relative phase shift while also imparting the desired transform. This approach works in limited situations and may impart some error on the result, however, it has been found suitable for use in the vehicle with the strut-type front suspension and the semi-trailing arm rear suspension.

More particularly, blocks 146 and 150 are combined into a single step with a relative phase-shifting transform as follows:

$$H_{VU} = \omega_{LF} - \omega_{LR} + \omega_{RF} - \omega_{RR},$$

where $H_{vu}$ is referred to as the un-filtered heave velocity. This relative phase shifting transform compares with the heave velocity transform disclosed in the above-mentioned pending application, U.S. Ser. No. 08/441,369, represented as:

$$H_{vu} = (\omega_{LF} + \omega_{LR} + \omega_{RF} + \omega_{RR})/4.$$

The difference is that the new transform, by reversing the signs of the rear wheel speed signals, imparts a phase shift of π radians on the rear wheel signals. It is noted that the π 2 radians phase shift is a bit more than required to compensate for the phase shift induced by the rear suspension and, thus, an error margin is present in the transform. However, the accuracy of the transform is sufficient for the suspension system control and the speed in which the phase shift and transform are produced justify the error margin introduced.

The output of the transform at block 150 is provided on line 152 to the second order band pass filter at block 154. An example band pass filter implementation is provided as:

$$Y(n) = A_1 * [X(n) - X(n-1)] + B_1 * Y(n-1) + B_0 * Y(n-2)$$

where $Y(n)$ is the filter output at time n, $X(n)$ is the filter input at time n and $A_1$, $B_1$, and $B_0$ are filter constants selected to pass frequencies typical of vehicle body motion, i.e., typically in the one hertz range. The band pass filter 154 is switchable in response to the longitudinal acceleration signal on line 110, changing the constants $A_1$, $B_1$, and $B_0$ during longitudinal acceleration events to make the filter more responsive by narrowing the range of frequencies passed through the filter, specifically, to cut off frequencies in 0.5 Hz range and below.

The output of the band pass filter 154 is then provided on line 156 to low pass filter 158 whose output is provided on line 160 to a second low pass filter 162. B,th low pass filters are first order low pass filters which are easily implemented in software. An example generic low pass filter equation is:

$$Y(n) = A_0 * X(n) + B_0 * Y(n-1),$$

where the filter constants $A_0$ and $B_0$ are set to eliminate any high frequency signal components, i.e., introduced by the signal sampling, that were not eliminated by the band pass filter. The resultant output on line 114 is the estimated heave velocity of the vehicle body.

Referring again to FIG. 5, block 116 responds to the wheel speed information to estimate a vehicle body pitch velocity and provide that estimation on line 118.

Figure 7:
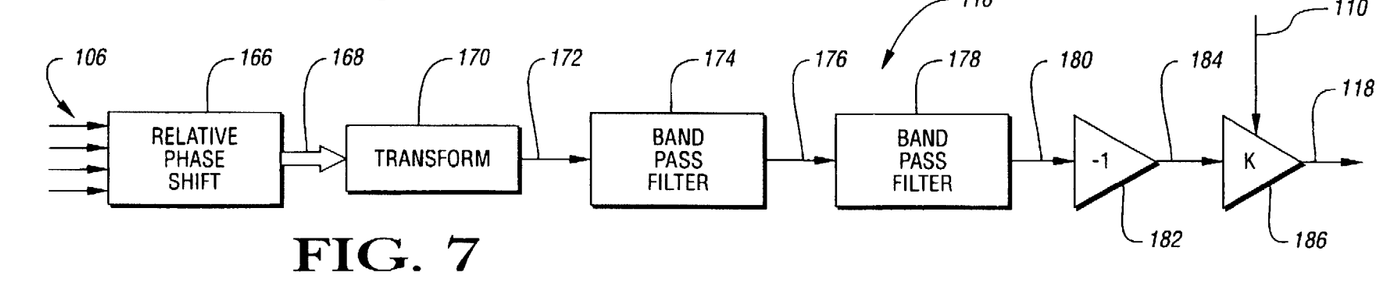
FIG. 7 illustrates an example control for determining a vehicle body pitch velocity.

More particularly, referring now also to FIG. 7, the pitch velocity estimation resembles the same generic structure as the heave velocity estimation—that is a relative phase shift 166 combined with a transform 170. As in the heave velocity transform, the relative phase shift can be implemented as: (i) a lag filter to impart relative phase lag on the front wheel speed signals to align the phase of the body vertical velocity components with the phase of like components of the rear wheel speed signals; (ii) an estimation filter to impart a relative phase advance on the rear wheel speed signals to align the phase of the body vertical velocity components with the phase of like components of the front wheel speed signals; or (iii) a combined phase shift and transform.

In a preferred example, the functions of the relative phase shift 166 and transform 170 are combined according to the following function:

$$P_{vu} = K_1 * \omega_{LF} + K_2 * \omega_{RF} + K_3 * \omega_{LR} + K_4 * \omega_{RR},$$

where $P_{vu}$ is referred to as the un-filtered pitch velocity and $K_1$, $K_2$, $K_3$ and $K_4$ are the coefficients described above with reference to block 108 (FIG. 5).

It is noted that the relative phase shifting pitch transform above differs from the pitch transform in the above mentioned pending application, U.S. Ser. No. 08/441,369, in which the pitch transform was described as:

$$P_{vu} = (-\omega_{LF} - \omega_{RF} + \omega_{LR} + \omega_{RR})/(2*WB),$$

where WB is the wheel base of the vehicle (this factor is also taken into account by the coefficients $X_{1-4}$ above). The sign change for the front wheel speeds appears to shift their phase π radians, but with the implementation of block 182 described below, it is clear that the phase shift is applied to the rear wheels.

The signal output from block 170 on line 172 is then band pass filtered by second order band pass filter 174 which provides its output signal on line 176 to another second order band pass filter 178. The two second order band pass filters 174, 178 are implemented because the signal output from the block 170 still contains significant road speed information, which, for purposes of defining body motion, a bias that is desirably removed by filtering.

Each of the second order band pass filters are implemented using the generic equation described above with reference to block 154 in FIG. 6. The band pass filters 174, 178 are centered around the frequency of body motion, typically 1 Hz. The band pass filters 174 and 178 also attenuate high frequency elements introduced by the signal sampling from the wheel speed sensors.

The estimation on line 180 is then inverted at block 182 to compensate for the sign convention used in the transform. The output of block 182 on line 184 is then multiplied by a gain at block 186 to scale the signal on line 184 as desired by the system designer. The gain at block 186 is preferably switchable in response to the signal on line 110, so that a reduced gain is provided when a longitudinal acceleration signal is indicated. In an alternative example, the gain at block 186 may be built into the filters 174, 176. The output of the block 186 is the estimated pitch velocity of the vehicle body.

Referring again to FIG. 5, block 120 receives the wheel speed sensor information from bus 106 and provides the roll estimation on line 122. The roll estimation may be simply computed as $\omega_{RF}-\omega_{LF}$, which result is then filtered, for example, by a band pass filter and a low pass filter to isolate body motion, remove any accumulated offset and remove high frequency noise.

By using only the front wheel speeds as inputs to the roll estimation, the effects of relative phase shift can be avoided since the front wheels are always in phase with respect to each other. However, if it is desired to use all four wheel speed signals as inputs to the roll transform, a relative phase shift can be implemented as discussed above either before the transform, or in certain instances, together with the transform.

Blocks 124 and 128 isolate for each wheel the body corner vertical motion content and the wheel vertical motion content of the wheel signal and provide those signals on lines 126 and 130, respectively. More particularly, referring now also to FIG. 8, both the body corner and wheel vertical motion contents are determined in the same manner. Block 192 represents a determination of the weighted average of the wheel speed signals as described above with reference to block 108 (FIG. 5). The weighted average is provided on line 194 to summation block 196 where it is subtracted from the individual wheel speed (which may have been previously filtered by a low pass filter to eliminate noise introduced in the sampling), represented on line 190. The output of summation block 196 on line 198 is provided to band pass filter 200.

Figure 8:
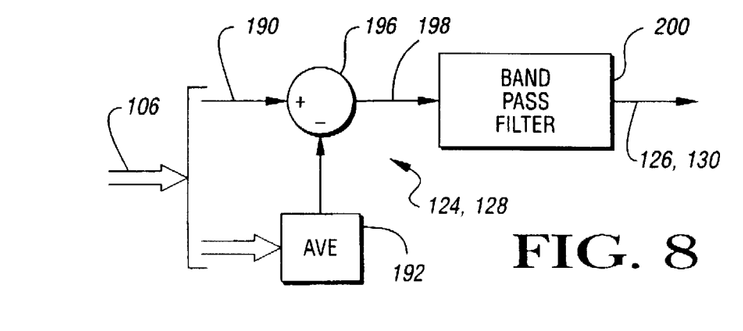
FIG. 8 illustrates an example control for determining wheel and body corner information.

Band pass filter 200 has a first set of coefficients to isolate the body vertical motion content of the signal on line 198, i.e., in the one hertz range. Band pass filter 200 also has a second set of coefficients to isolate the wheel vertical motion content of the signal on line 198, i.e., in the 15 to 20 Hz range, this range may vary from vehicle to vehicle. The results of the band pass filter 200 are the corner body and wheel content signals on lines 126 and 130 respectively. The band pass filter coefficients may vary for front and rear suspensions as different types of suspensions and the effects of varying front and rear loads may require separate free tuning of the filter 200.

Referring again to FIG. 5, the signals on lines 114, 118, 122, 126 and 130 are provided to the suspension control algorithm block 132, which may be responsive to other input signals. Block 132 implements a control algorithm to determine actuator commands for the suspension actuator in response to the signals and outputs those commands on bus 134. An example suitable control is set forth in U.S. Pat. No. 5,570,288, which describes body and wheel command components. The body components are determined by body modal velocity signals such as provided on lines 114, 118 and 122. The wheel command components may be omitted according to this example and the signal on line 126 may be used for quadrant checking to ensure that the control commands are implemented according to known sky-hook control functions as exemplified in the U.S. Pat. No. 5,570,288.

The signals on lines 126 and 130 carrying the corner body and wheel contents of the wheel speed signals are also provided to the dynamic normal force determination block 138. More particularly, referring now also to FIG. 9, the dynamic normal force determination block 138 receives the body and wheel signals on lines 126 and 130, provides them to the estimation filters 208 and 210, tuned to the wheel and body frequencies respectively, to provide estimations on lines 212 and 214 of the wheel and body accelerations for each corner of the vehicle. Kalman filters implementing models of the suspension system may be implemented to estimate corner acceleration from the signals on lines 126 and 130. These filters may be similar to that exemplified in U.S. Pat. No. 5,454,630, assigned to the assignee of this invention.

Figure 9:
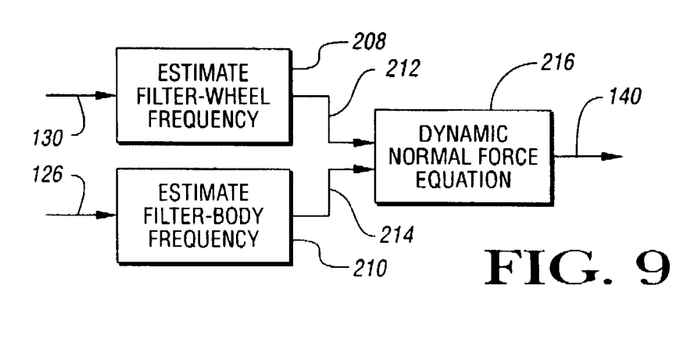
FIG. 9 illustrates an example control for determining corner dynamic normal force.

The estimated body corner and wheel vertical accelerations on lines 212 and 214 are then provided to block 216. Block 216 utilizes the known masses of the vehicle body and wheels to compute a dynamic normal force between each tire and the road responsive to the body corner and wheel vertical accelerations. The resultant normal force estimates between each wheel and the road are then used to control the braking system in a manner such as described in U.S. Pat. No. 5,454,630, or as described in pending U.S. patent application, Ser. No. 08/547,084. Because the details of such control are fully set forth in said patent and pending application and are not central to this invention, they are not repeated herein.

Figures 10, 11:
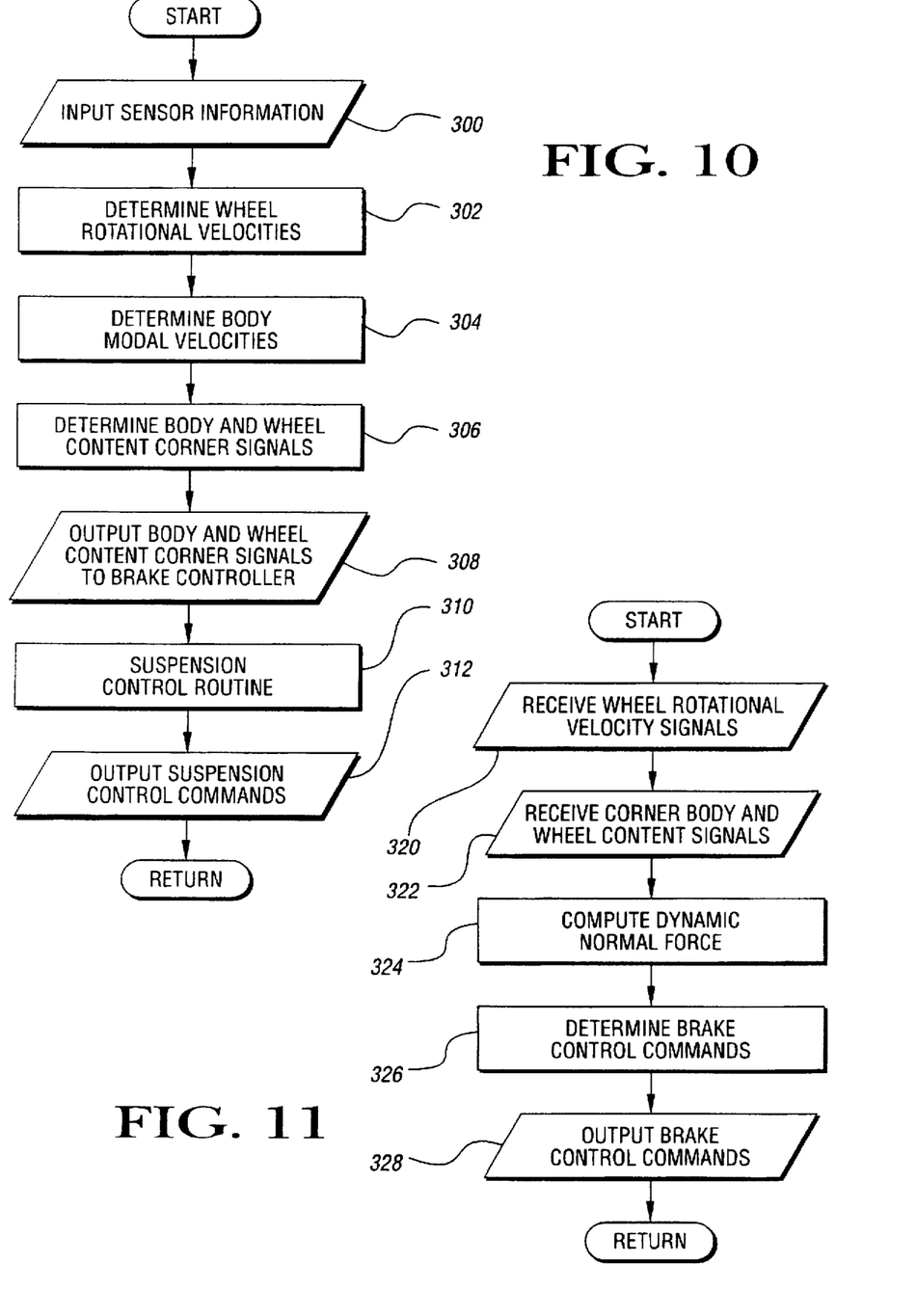
FIGS. 10 and 11 are control flow diagrams of an example implementation of this invention.

Referring now to FIG. 10, an example control routine implemented by a suspension controller to control the variable force suspension actuators starts and moves to blocks 300 and 302 where it inputs the speed sensor information and determines the wheel rotational velocities responsive to the wheel rotational velocity sensors. Alternatively, this step may be performed by the vehicle brake system controller and the results provided to the suspension controller through a data bus.

At block 304 the routine determines the body heave, pitch and roll velocities using the relative phase shifts to achieve phase alignment of the body vertical motion components of the speed signals as described above with reference to FIGS. 5–7. Then block 306 determines the body and wheel corner content signals described above with reference to FIGS. 5 and 9. At block 308, the routine outputs the body and wheel corner signals to the brake controller and then, at block 310, the routine runs the suspension controller algorithm such as referred to above with respect to U.S. Pat. No. 5,570,288 or such as described in U.S. Pat. No. 5,062,658, the disclosures of which are both incorporated herein by reference. It will readily apparent to those skilled in the art that there are a variety of suspension control routines in the public domain and available to those skilled in the art that make use of body modal velocity signals and any such control routines may be implemented at block 310 to be used with this invention.

At block 312, the suspension control commands are output to the actuator 21 (FIG. 4) and the command routine is ended, to be repeated with every control loop of the suspension controller.

Referring now to FIG. 11, an example control implemented by the brake controller is starts at block 320 where it receives the wheel rotational velocity signals and computes the rotational velocities responsive thereto. At block 322, the routine receives the body and wheel corner content signals from the suspension controller. At block 324, the routine computes the dynamic normal force as described above with reference to FIG. 9 in response to the body and wheel content corner signals and then at block 326, the routine determines the brake control commands responsive to both the dynamic normal force and the wheel rotational velocities in the manner set forth, for example, in U.S. Pat. No. 5,454,630. The resultant brake control commands are then output at block 328 to control the brake actuators to effect the desired braking response.

As described above, the filtering in the body modal velocity estimation is implemented after the relative phase shift and transform are completed. In another example, the filters to isolate the body vertical motion content of the wheel speed signals can be done prior to the relative phase shifting and transform. In this example, the filtering may be combined with the phase shift function by implementing a filter, for example, that implements the band pass function and imparts a desired lag. Such filters are well known to those skilled in the art.

It will be understood by those skilled in the art that the brake control algorithm referred to herein is an example brake control algorithm and that any other suitable brake control algorithm responsive to the corner body and wheel vertical motion content signals may be used instead. It will also be understood that the brake system and suspension system hardware illustrated are examples and any controllable brake and suspension system hardware may be used with this invention.

I claim:

1. A vehicle chassis system control for use in a vehicle with a first suspension that induces a phase shift on body motion components of wheel speed sensor signals from a first set of wheel speed sensors connected to a first set of wheels mounted to the first suspension, comprising the steps of:

sensing first rotational velocities of the first set of wheels using the first set of wheel speed sensors;

sensing second rotational velocities of a second set of wheels mounted to a second suspension using a second set of wheel speed sensors;

estimating at least one modal velocity of a body of the vehicle responsive to the first and second rotational velocities, wherein the step of estimating comprises the sub-steps of:

(a) imposing a relative phase shift between the first and second rotational velocities to compensate for the phase shift induced by the first suspension, (b) transforming the relative phase shifted first and second rotational velocities to a signal indicative of a modal velocity of the body of the vehicle using a corner to body modal transform, and (c) filtering at least one member of a set comprising (i) the first and second rotational velocities and (ii) the signal indicative of the modal velocity of the body of the vehicle, to isolate body frequency components of said at least one member;

determining a chassis system control command responsive to the estimation; and applying the chassis system control command to a chassis system actuator to control the chassis system responsive to the estimation.

2. A vehicle chassis system control according to claim 1, wherein the first suspension is a semi-trailing arm rear suspension.

3. A vehicle chassis system control according to claim 1, wherein the body modal velocity is body heave velocity.

4. A vehicle chassis system control according to claim 1, wherein the body modal velocity is body pitch velocity.

* * * * *